(12) United States Patent
Madala et al.

(10) Patent No.: US 12,135,794 B2
(45) Date of Patent: Nov. 5, 2024

(54) SYSTEMS AND METHODS FOR VALIDATED VULNERABILITY PROOFING

(71) Applicant: Dell Products, L.P., Round Rock, TX (US)

(72) Inventors: Raveendra Babu Madala, Bangalore (IN); Santosh Gore, Bangalore (IN); Muniswamy Setty K S, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 231 days.

(21) Appl. No.: 18/048,103

(22) Filed: Oct. 20, 2022

(65) Prior Publication Data
US 2024/0134997 A1  Apr. 25, 2024
US 2024/0232374 A9  Jul. 11, 2024

(51) Int. Cl.
*G06F 21/57* (2013.01)
*G06F 8/65* (2018.01)

(52) U.S. Cl.
CPC ............ *G06F 21/577* (2013.01); *G06F 8/65* (2013.01)

(58) Field of Classification Search
CPC .................................. G06F 21/577; G06F 8/65
See application file for complete search history.

(56) References Cited

U.S. PATENT DOCUMENTS

| | | | |
|---|---|---|---|
| 9,064,134 B1 * | 6/2015 | Agarwal | G06F 21/577 |
| 10,084,809 B1 * | 9/2018 | Rambo | G06F 21/577 |
| 10,140,453 B1 * | 11/2018 | Fridakis | G06F 21/577 |
| 10,469,517 B1 * | 11/2019 | Higbee | H04L 63/1433 |
| 10,534,918 B1 * | 1/2020 | Davidi | G06F 21/577 |
| 11,070,582 B1 * | 7/2021 | Berger | H04L 63/1433 |
| 11,153,074 B1 * | 10/2021 | Nikitas | H04L 9/0897 |
| 11,271,961 B1 * | 3/2022 | Berger | G06F 9/451 |
| 11,374,958 B2 * | 6/2022 | Ngo | H04L 63/10 |
| 11,681,811 B1 * | 6/2023 | Dixit | H04L 9/50 726/25 |
| 2008/0163374 A1 * | 7/2008 | Rogers | G06F 11/0748 726/25 |
| 2008/0189788 A1 * | 8/2008 | Bahl | H04L 63/1416 726/25 |
| 2013/0239168 A1 * | 9/2013 | Sreenivas | G06F 21/57 726/1 |

(Continued)

*Primary Examiner* — Darren B Schwartz
(74) *Attorney, Agent, or Firm* — Fogarty LLP

(57) ABSTRACT

Systems and methods provided for vulnerability proofing updates to an IHS (Information Handling System). Upon receipt of an update to hardware component configurations of the IHS, vulnerability proofing requirements for modifications to the hardware component configurations are retrieved, including requirements for modifications that are validated for operation of a computational workload by the IHS. Based on the vulnerability proofing requirements, catalogs specifying known vulnerabilities of hardware components are consulted to determine whether the modifications are identified as vulnerable in the catalogs and whether remediations to the identified vulnerabilities are validated for operation of the workload. If the modifications are not identified as vulnerable in the catalogs, the update is transmitted to the IHS. If the modifications are identified as vulnerable in the catalogs and remediations to the identified vulnerabilities are not validated for operation of the workload, the update is terminated.

20 Claims, 5 Drawing Sheets

(56) References Cited

U.S. PATENT DOCUMENTS

| | | | | |
|---|---|---|---|---|
| 2014/0331326 | A1* | 11/2014 | Thakur | H04L 63/1433 |
| | | | | 726/25 |
| 2017/0078322 | A1* | 3/2017 | Seiver | H04L 63/1433 |
| 2017/0286689 | A1* | 10/2017 | Kelley | G06F 21/577 |
| 2018/0004953 | A1* | 1/2018 | Smith, II | H04L 9/3268 |
| 2018/0219908 | A1* | 8/2018 | Tamir | H04L 63/1441 |
| 2018/0351987 | A1* | 12/2018 | Patel | G06F 21/577 |
| 2019/0166149 | A1* | 5/2019 | Gerrick | G06F 21/577 |
| 2019/0238584 | A1* | 8/2019 | Somasundaram | H04L 63/20 |
| 2019/0245879 | A1* | 8/2019 | Ward | H04L 63/0236 |
| 2020/0183677 | A1* | 6/2020 | Hong | G06F 8/66 |
| 2020/0202005 | A1* | 6/2020 | Wurster | G06F 9/30029 |
| 2020/0228560 | A1* | 7/2020 | Murthy | H04L 63/20 |
| 2020/0272743 | A1* | 8/2020 | Song | H04L 63/1433 |
| 2020/0311630 | A1* | 10/2020 | Risoldi | G06F 3/0482 |
| 2020/0372156 | A1* | 11/2020 | Sayyed | G06F 21/577 |
| 2021/0141906 | A1* | 5/2021 | Pickren | G06F 21/577 |
| 2021/0336992 | A1* | 10/2021 | Shivanna | H04L 63/20 |
| 2022/0245260 | A1* | 8/2022 | Priller | H04L 63/1433 |
| 2023/0019180 | A1* | 1/2023 | de Nijs | G06F 21/577 |
| 2023/0061121 | A1* | 3/2023 | Tosevska | A61K 31/121 |
| 2023/0259633 | A1* | 8/2023 | Oddo | G06F 21/577 |
| | | | | 726/25 |
| 2024/0028730 | A1* | 1/2024 | Munger | G06F 21/572 |

* cited by examiner

Amended FIG. 1

SYSTEMS AND METHODS FOR VALIDATED VULNERABILITY PROOFING

FIELD

The present disclosure relates generally to Information Handling Systems (IHSs), and relates more particularly to preventing IHSs from being configured with known vulnerabilities.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations of any individual server in the data center. Moreover, administration of such large groups of servers may require teams of remote and local administrators working in shifts in order to support around-the-clock availability of the data center operations, while also minimizing any downtime.

Each server IHS within a data center may support a wide variety of possible hardware and software configurations. For instance, a server IHS may be manufactured accordingly to customized hardware and software configurations requested by a customer. In addition, upon manufacture and delivery to a customer, a received server may be provisioned for deployment according to the particular requirements of that customer. Additionally, throughout the lifetime of a server, replaceable hardware components of the server may be added, removed and repaired. Software and firmware may also be updated regularly as part of routine maintenance, to correct errors and/or to adapt the functionality of a server IHS to a specific computing task.

In some instances, these various configurations of a server IHS may themselves render the server vulnerable, even in scenarios where the configurations are intended as updates to the hardware and/or software of the server. Even though these configurations may be updated, the configurations may nonetheless be known to exhibit various types of known vulnerabilities, such as security vulnerabilities that can exploited by malicious actors and such as functional vulnerabilities that can result in errors or failures. Despite these vulnerabilities being publicly known, the administrator making the configuration changes may be unaware of these vulnerabilities, thus rendering the server configuration as vulnerable from the outset. Such issues may be exacerbated by the differing protocols and procedures that may be used in the administration of a server IHS throughout its lifetime. As different administrators configure a server according to changing policies, inconsistent configuration of the server tends to result in the server becoming increasingly vulnerable.

SUMMARY

In various embodiments, IHSs (Information Handling Systems) support a computational workload and may include: one or more CPUs utilizing one or more buses that connect to a plurality of hardware components of the IHS; and a remote access controller supporting remote management of the Information Handling System (IHS), the remote access controller comprising a logic unit and a memory device having instructions stored thereon that, upon execution by the logic unit, cause the remote access controller to: receive, from an update system, an indication of an update comprising configurations for a plurality of the hardware components of the IHS; retrieve a plurality of vulnerability proofing requirements for updates that modify the configuration the plurality of hardware components of the IHS, wherein the vulnerability proofing requirements comprise requirements for updates that are validated for operation of the workload; transmit the vulnerability proofing requirements to the update system, where based on the vulnerability proofing requirements a plurality of catalogs specifying known vulnerabilities of hardware components are consulted to determine whether configurations from the update are identified as vulnerable in one or more of the catalogs and whether remediations to the identified vulnerabilities are validated for operation of the workload; when the configurations from the update are not identified in the plurality of catalogs specified in the vulnerability proofing requirements, receive transmission of the update from the update system for use in updating the configurations for the hardware components of the IHS; and when the configurations from the update are identified in the catalogs specified in the vulnerability proofing requirements and remediations to the identified vulnerabilities are not validated for operation of the workload, receive a notification from the update system that the update has been terminated.

In some IHS embodiments, the plurality of catalogs comprise a catalog of vulnerabilities known to a manufacturer of the IHS. In some IHS embodiments, the plurality of catalogs comprise a catalog of vulnerabilities known to an entity operating the IHS. In some IHS embodiments, the vulnerability proofing requirements are retrieved from a factory provisioned identity certificate of the IHS. In some IHS embodiments, the validation proofing requirements in the inventory certificate further specify the plurality of catalogs of known vulnerabilities for use in identifying configurations that are vulnerable.

In some IHS embodiments, the validation proofing requirements in the inventory certificate further specify the workload that is supported by the IHS and a requirement of updates that are validated as compatible with the workload. In some IHS embodiments, remediations specified in the catalogs as validated remediation to an identified vulnerability are validated as complying with technical and performance requirements for the workload. In some IHS embodiments, the validation of the remediations as complying with technical and performance requirements for the workload is determined in a test environment the is operated using a datacenter remote management interface. In some IHS embodiments, the configurations of the update comprises a firmware update for instructions used to operate a first of the hardware components. In some IHS embodiments, the catalogs specify alternate firmware versions that are used to operate the first of the hardware components, and that are not associated with known vulnerabilities, and that have been validated for operation of the workload. In some IHS embodiments, in response to the notification from the update system that the update has been terminated, further logic execution causes the remote access controller to issue a request for updated identity certificate with updated vulnerability proofing requirements.

In various additional embodiments, methods are provided for vulnerability proofing updates to an IHS, wherein the vulnerability proofing is implemented by a remote access controller of the IHS that provides remote management of the IHS. The methods may include: receiving, from an update system, an indication of an update comprising configurations for one or more of the plurality of hardware components of the IHS; retrieving a plurality of vulnerability proofing requirements for updates that modify the configuration the plurality of hardware components of the IHS, wherein the vulnerability proofing requirements comprise requirements for updates that are validated for operation of the workload; transmitting the vulnerability proofing requirements to the update system, where based on the vulnerability proofing requirements a plurality of catalogs specifying known vulnerabilities of hardware components are consulted to determine whether configurations from the update are identified as vulnerable in one or more of the catalogs and whether remediations to the identified vulnerabilities are validated for operation of the workload; when the configurations from the update are not identified in the plurality of catalogs specified in the vulnerability proofing requirements, receiving transmission of the update from the update system for use in updating the configurations for one or more of the plurality of hardware components of the IHS; and when the configurations from the update are identified in the plurality of catalogs specified in the vulnerability proofing requirements and remediations to the identified vulnerabilities are not validated for operation of the workload, receiving an notification from the update system that the update has been terminated.

In some method embodiments, the plurality of catalogs comprise a catalog of vulnerabilities known to a manufacturer of the IHS. In some method embodiments, the plurality of catalogs comprise a catalog of vulnerabilities known to an entity operating the IHS. In some method embodiments, the vulnerability proofing requirements are retrieved from a factory provisioned identity certificate of the IHS. In some method embodiments, the validation proofing requirements further specify the plurality of catalogs of known vulnerabilities for use in identifying configurations that are vulnerable.

In various additional embodiments, systems may include: a remote management interface used in management of a datacenter comprising a plurality of IHSs, wherein the remote management interface is configured to: generate modifications to configurations of hardware components of a first of the plurality of IHSs; query the first IHS for vulnerability proofing requirements for modifications to configurations of the plurality of hardware components of the first IHS, wherein the vulnerability proofing requirements comprise requirements for modifications that are validated for operation of the workload; based on the vulnerability proofing requirements, access a plurality of catalogs specifying known vulnerabilities of hardware components to determine whether the modifications are identified as vulnerable in one or more of the catalogs and whether remediations to the identified vulnerabilities are validated for operation of the workload; when the modifications to the configurations of the hardware components of the first IHS are not identified in the plurality of catalogs specified in the vulnerability proofing requirements, transmission the modifications to the first IHS; and when modifications to the configurations of the hardware components of the first IHS are identified as vulnerable in the plurality of catalogs specified in the vulnerability proofing requirements, terminate the update; and the first IHS comprising: one or more CPUs utilizing one or more buses that connect to a plurality of hardware components of the IHS; and a remote access controller supporting remote management of the first IHS, the remote access controller comprising a logic unit and a memory device having instructions stored thereon that, upon execution by the logic unit, cause the remote access controller to: receive the notification of modifications to configurations of hardware components of the first IHS; and in response to the query from the update system, retrieve, from a persistent data storage of the first IHS, a plurality of vulnerability proofing requirements for updates that modify the configuration of hardware components of the first IHS, wherein the vulnerability proofing requirements comprise the requirements for modifications that are validated for operation of the workload.

In some system embodiments, the plurality of catalogs comprise a catalog of vulnerabilities known to a manufacturer of the IHS. In some system embodiments, the plurality of catalogs comprise a catalog of vulnerabilities known to an entity operating the IHS. In some system embodiments, the vulnerability proofing requirements are retrieved from a factory provisioned identity certificate of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
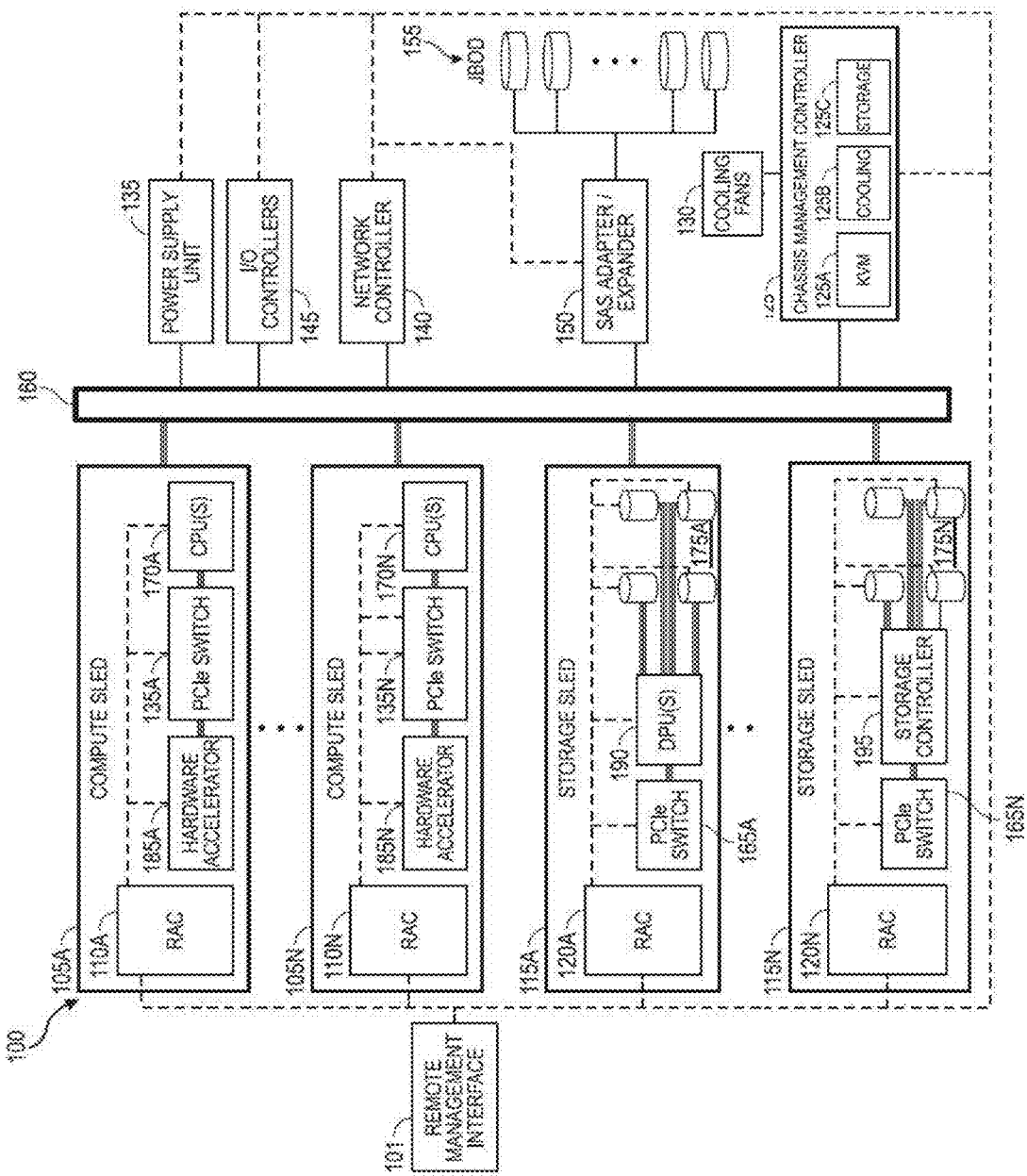
FIG. 1 is a diagram illustrating certain components of a chassis configured, according to some embodiments, for validated vulnerability proofing of updates used in the administration of IHSs that are components of the chassis.

FIG. 1 is a block diagram illustrating certain components of a chassis 100 comprising one or more compute sled IHSs 105*a-n* and one or more storage sleds IHSs115*a-n* that may be configured to implement the systems and methods described for validated vulnerability proofing of updates used in the administration of IHSs 105*a-n*, 115*a-n* that are components of the chassis 100. Embodiments of chassis 100 may include a wide variety of hardware configurations in which one or more IHS 105*a-n*, 115*a-n* are installed in chassis 100. Such variations in hardware configurations may result from chassis 100 being factory assembled to include components specified by a customer that has contracted for manufacture and delivery of chassis 100.

Upon delivery and deployment of a chassis 100, the chassis 100 may be modified by replacing and/or adding various hardware components, in addition to replacement of the removeable IHSs 105*a-n*, 115*a-n* that are installed in the chassis. In addition, once the chassis 100 has been deployed, firmware and other software used by individual hardware components of the IHSs 105*a-n*, 115*a-n*, or by other hardware components of chassis 100, may be modified in order to update the operations that are supported by these hardware components. In some instances, such updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

As described in additional detail below, some of the updates to the IHSs 105*a-n*, 115*a-n* installed in chassis 100 may be initiated using update packages that include a suite of hardware and/or software configurations. Rather than updating internal hardware components of IHSs 105*a-n*, 115*a-n* individually, an administrator, whether manual or automated, may utilize an update package that includes a suite of updates for use in the operation of the hardware and software of an IHS. This same update package can be utilized on one or all of the IHSs 105*a-n*, 115*a-n* of chassis 100. Moreover, it may be utilized in the administration of IHSs 105*a-n*, 115*a-n* throughout a datacenter. Accordingly, any vulnerabilities present in an update package may be inadvertently spread throughout a datacenter. As described in additional detail below, in some embodiments, the generation of update packages may be proofed for any known vulnerabilities based on factory-provisioned vulnerability proofing instructions provided by the IHS 105*a-n*, 115*a-n*, thus preventing an IHS from being updated to utilize hardware or software configurations with known vulnerabilities. Embodiments may enforce requirements for updates that have been validated as being compatible with a computing workload being supported by the IHS 105*a-n*, 115*a-n*, where the validation confirms that the updates are both compatible with the technical requirements of the computing workload and have been successfully tested in supporting performance requirements for the workload.

Chassis 100 may include one or more bays that each receive an individual sled (that may be additionally or alternatively referred to as a tray, blade, and/or node) IHSs, such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105*a-n* and storage sleds 115*a-n*, thus providing efficiency improvements and supporting greater computational loads. For instance, certain computational workloads, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165*a-n* installed in the IHSs 105*a-n*, 115*a-n* of the chassis. These high-speed data links may be used to support algorithm implementations that span multiple processing, networking and storage components of an IHS and/or chassis 100. For instance, computational workloads may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as using an update package, such as to adapt the capabilities of the respective hardware accelerators 185*a*-n to specific computing tasks. In some instances, firmware updates to hardware accelerators 185*a-n* may serve to adapt the hardware accelerator for a particular computing function, or for a particular operating environment.

Chassis 100 may be installed within a rack structure that provides at least a portion of the cooling utilized by the IHSs 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
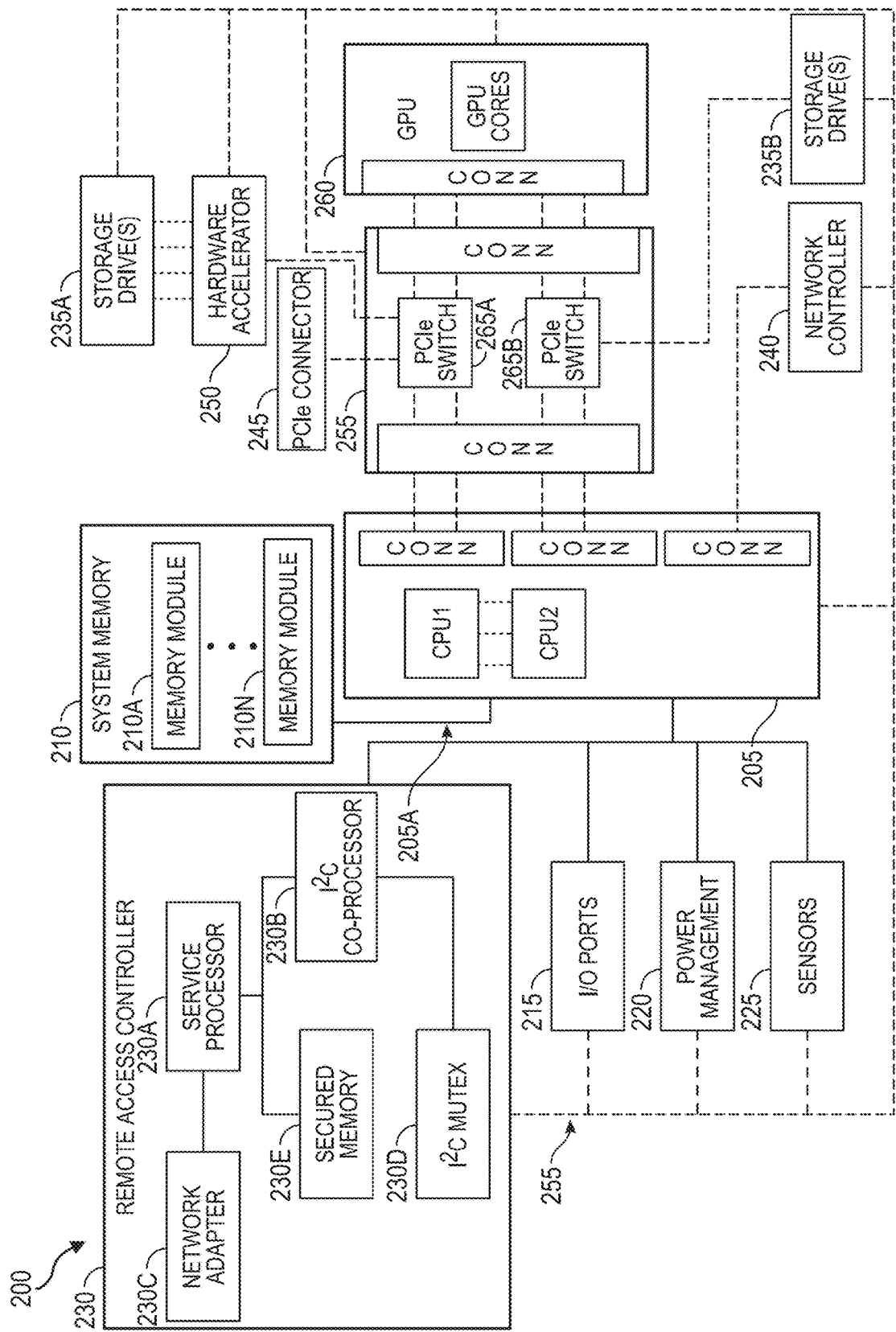
FIG. 2 is a diagram illustrating certain components of an IHS configured, according to some embodiments, for validated vulnerability proofing of updates used in the administration of the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing workloads, such as artificial intelligence systems provided via cloud computing implementations. Sleds 105a-n, 115a-n are regularly configured with hardware and software that provide leading-edge computational capabilities. Accordingly, services that are provided using such computing capabilities that are provided as high-availability systems that operate with minimum downtime.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. In various embodiments, these capabilities of the remote access controllers 110a-n, 120a-n may be utilized in updating the firmware or other software utilized by hardware components of chassis 100 and/or of hardware components of the sleds 110a-n, 120a-n, in some instances using update packages.

As described in additional detail below, remote access controllers 110a-n, 120a-n may be configured to enforce validation proofing when update packages are being utilized by respective IHS sleds 105a-n, 115a-n that are installed in chassis 100. Chassis 100 and IHSs 105a-n, 115a-n may be administered through the use of update packages that includes suites of software updates and/or updates for one or more hardware components of the IHSs 105a-n, 115a-n, such as storage drives 175a-n and hardware accelerators 185a-n. Each time an update package is utilized, opportunities arise for IHSs 105a-n, 115a-n to be unintentionally updated with hardware and/or software configurations that include known vulnerabilities. In some embodiments, the generation of update packages for use by sleds IHS 105a-n, 115a-n includes vulnerability proofing of the configurations included in the update packages, such that the update packages with known vulnerabilities cannot be utilized in the administration of chassis 100. As part of this validation proofing of updates for IHS 105a-n, 115a-n, embodiments may enforce requirements for the use of updates that have been validated as compatible with a computing workload being supported by the IHS.

Through such capabilities that are implemented in each of the sled IHSs 105a-n, 115a-n, opportunities are mitigated for a single hardware component of one of the sleds 105a-n, 115a-n to be configured with known vulnerabilities in a manner that can result in increased vulnerability for the entire chassis 100. In embodiments, any use of an update package with known vulnerabilities in sled IHSs 105a-n, 115a-n may be detected and halted by the respective remote access controllers 110a-n, 120a-n. In some embodiments, chassis management controller 125 may similarly utilize the vulnerability proofing described herein in order to ensure that update packages using in the administration of chassis 100 do not include known vulnerabilities and have been validated for workloads being supported by the chassis. For instance, power settings supported by the chassis management controller may apportion power to various sled IHSs 105a-n, 115a-n according to requirements of a workload in which the IHSs are participants.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates, such as using an update package, to the software and hardware installed in the chassis 100. For example, remote management interface 101 may provide capabilities by which an administrator can utilize an update package to initiate updates to the firmware utilized by all of the storage drives 175a-n installed in a chassis 100, or to the firmware utilized by all of the storage drives 175a-n of a particular model or manufacturer. As described in additional detail below, in embodiments, update packages that are generated using remote management interface 101 may be proofed for known vulnerabilities and that remediations to known vulnerabilities are validated as compatible with workload requirements based on instructions provided by the individual IHSs 105a-n, 115a-n that will receive the updates.

In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185*a-n*, such as the described DPUs, GPUs, Smart NICs and FPGAs, that may be programmed and adapted for specific computing workloads, such as to support machine learning or other artificial intelligence systems. As described in additional detail below, compute sleds 105*a-n* may include a variety of hardware components, such as hardware accelerator 185*a-n* and PCIe switches 135*a-n*, that operate using firmware that may be occasionally updated, such as using an update package, to adapt these programmable components for operation for different computing workloads.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, where the individual storage drives 175*a-n* may be accessed through a PCIe switch 165*a-n* of the respective storage sled 115*a-n*.

As illustrated, a storage sled 115*a* may include one or more DPUs (Data Processing Units) 190 that provide access to and manage the operations of the storage drives 175*a* of the storage sled 115*a*. Use of a DPU 190 in this manner provides low-latency and high-bandwidth access to numerous SSDs 175*a*. These SSDs 175*a* may be utilized in parallel through NVMe transmissions that are supported by the PCIe switch 165*a* that connects the SSDs 175*a* to the DPU 190. In some instances, PCIe switch 165*a* may be in integrated component of a DPU 190. The data storage and retrieval capabilities provided by such storage sled 115*a* implementations may be harnessed by offloading storage operations directed as storage drives 175*a* to a DPU 190*a*, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some instances, storage controller 195 may provide support for RAID (Redundant Array of Independent Disks) configurations of logical and physical storage drives, such as storage drives provided by storage sled 115*n*. In some instances, storage controller 195 may be a HBA (Host Bus Adapter) that provides more limited capabilities in accessing storage drives 175*n*.

In addition to the data storage capabilities provided by storage sleds 115*a-n*, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175*a-n*, 155 may be coupled to chassis 100, a wide variety of different storage topologies may be supported. Through these supported topologies, storage drives 175*a-n*, 155 may be logically organized into clusters or other groupings that may be collectively tasked and managed to support specific computing workloads. In some instances, a chassis 100 may include numerous storage drives 175*a-n*, 155 that are identical, or nearly identical, such as arrays of SSDs of the same manufacturer and model. Accordingly, any updates or other administration of storage drives 175*a-n*, 155 requires the updates to be applied within each of these topologies being supported by the chassis 100. Despite the large number of different storage drive topologies that may be supported by an individual chassis 100, the firmware or other software used by each of these storage devices 175*a-n*, 155 may be occasionally updated, such as using an update package.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, such as using an update package, to enable and disable features supported by the network controller.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as using an update package, to adapt the power supply unit for operation according to different modes of operation.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated using an update package, such as to adapt the I/O controller 140 for operation with different external systems. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein validated vulnerability proofing of updates used in the administration of IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1 RU server installed within a 2 RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or other component that is coupled to a connector (e.g., PCIe connector of a motherboard, backplane, midplane, etc.) of IHS

200. In some embodiments, network controller 240 may support high-bandwidth network operations by the IHS 200 through a PCIe interface that is supported by the chipset of CPUs 205. Network controller 240 may operate according to firmware instructions that may be occasionally updated, such as using an update package.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. In some embodiments, each of the PCIe switches 265*a-b* may be a replaceable expansion card or other component that is coupled to a connector of IHS 200. Each of the PCIe switches 265*a-b* may operate according to firmware instructions that may be occasionally updated, such as using an update package.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated, such as using an update package. In some embodiments, each of the storage drives 235*a-b* may be replaceable components that are coupled to a connector of IHS 200.

As illustrated, PCIe switch 265*a* is coupled via a PCIe link to a hardware accelerator 250, such as a DPU, SmartNIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing) (i.e., x86) cores. Each programmable hardware accelerator 250 may operate according to firmware or other instructions that may be occasionally updated for operation in support of a computing workload, such as using an update package.

In the illustrated embodiment, the programmable capabilities of hardware accelerator 250 implements functions used to support replaceable storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various supported workloads, hardware accelerator 250 may support high-bandwidth connections, such as PCIe connections, with networking devices in implementing functions of a network switch, compression and codec functions, virtualization operations or cryptographic functions. In some instances, updates to firmware utilized by hardware accelerators 250 may enable and disable features supported by the hardware accelerators 250, where such firmware updates may be included in an update package.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each replaceable GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for workloads performing streaming calculation of vector data, matrix data and/or other graphics data, thus supporting the rendering of graphics for display on devices coupled either directly or indirectly to IHS 200. In some workloads, GPUs may be utilized in workloads as programmable computing resources for offloading other functions from CPUs 205, in the same manner as hardware accelerator 250. Accordingly, GPUs 260 may operate according to firmware instructions that may be occasionally updated, such as using an update package.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245*a*, a variety of removeable data storage devices, graphics processors and network interface cards may be coupled to IHS 200, thus supporting a wide variety of topologies of devices that may be removably coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for validated validation proofing of updates for use in the administration of IHS 200, may operate using validated instructions, and thus within the root of trust of IHS 200.

As provided above, remote access controller 230 may be configured to support the use of validation proofing procedures during the generation of update packages for use in the administration of IHS 200, where the validation proofing procedures ensure an IHS is not updated with configurations that include known vulnerabilities that cannot be remediated with configuration that have been validated as complying with technical and performance requirements of a computing workload being supported by the IHS, such as requirements determined by use of test environments available to a remote management interface used in the administration of a datacenter. Otherwise, in instances where the update system identifies known vulnerabilities in an update package that cannot be remediated in a manner that is validated for the operation of workloads supported by IHS 200, embodiments may halt transmission of the update package to the IHS 200. In embodiments, the cloud system generating the update package determines the vulnerability proofing requirements for the update package from the IHS 200, and in particular from the remote access controller 230. As described in additional detail below, remote access controller 230 determines the vulnerability proofing requirements based on factory provisioned instructions. In this manner, remote access controller 230 prevents updates being made to IHS 200 when the updates include known vulnerabilities that cannot be remediated without compromising the ability of IHS 200 to provided continued support for a computational workload.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
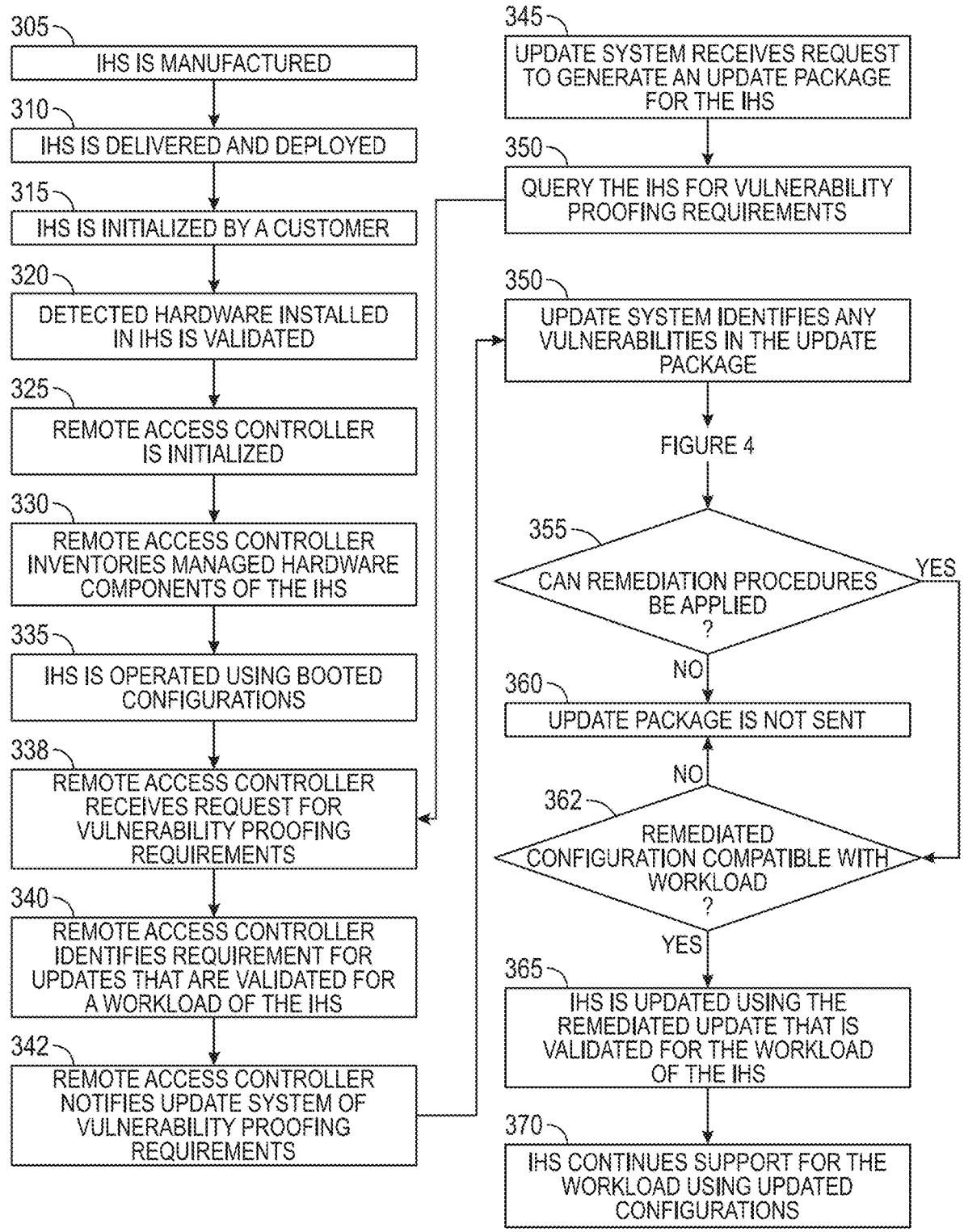
FIG. 3 is a flow chart diagram illustrating certain steps of methods, according to some embodiments, for validated vulnerability proofing of updates used in the administration of an IHS.

FIG. 3 is a flow chart diagram illustrating certain steps of methods, according to some embodiments, for validated vulnerability proofing of updates used in the administration of an IHS, such as the IHSs described with regard to FIGS. 1 and 2. Some embodiments of the method of FIG. 3 may begin, at block 305, with the factory assembly and provisioning of an IHS, such as a server IHS described with regard to FIGS. 1 and 2, where the IHS is factory provisioned to implement procedures that implement validated vulnerability proofing of updates used in the administration of an IHS, thus ensuring that vulnerabilities are not introduced when intending to update an IHS and that these updates do not compromise the ability to the IHS to continue in support a computing workload.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer, such as to support a specific computing workload. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. For example, a customer request an IHS with a specific set of hardware components installed, where each of the hardware components in the requested configuration operates using a specific firmware version.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. The manifest generated during assembly of an IHS is provided to the factory provisioning application that will being used to provision the assembled IHS, which includes installing firmware and other software on the IHS.

As part of the this factory provisioning, one or more firmware versions and associated firmware settings may be loaded for use by various hardware components of the IHS. In some embodiments, the one or more firmware versions that are loaded for use by each hardware component during factory provisioning may be determined based on a service agreement or other configuration for the IHS that was selected by a customer as part of the purchase of the IHS. Once the set of firmware versions for each of the hardware components of the IHS has been selected, the factory provisioning application may confirm the authenticity and integrity of the selected firmware versions based on digital signatures provided by hardware component manufacturers or other entities providing the firmware. The manifest of the IHS may then be updated to identify the firmware versions that are supported by each of the managed hardware components of IHS and may also be updated to include digital signatures associated with each of the supported firmware versions. In this manner, the factory-provisioning system may upload one or more supported firmware versions to at least some of the factory-installed hardware components of an IHS.

Based on the hardware inventory and firmware version information that is specified in the manifest of the IHS, the factory provisioning application may initiate the generation of an identity certificate that may be used to validate the detected hardware components of the IHS as the same hardware components that were installed during the factory assembly of the IHS. In addition, in some embodiments, an identity certificate may be further factory provisioned to also include vulnerability proofing instructions for use when generating packages for administration of the IHS. Once the IHS has been delivered, the inventory certificate may then be used to validate the authenticity of the detected hardware and software of an IHS, and to further validate the vulnerability proofing instructions in the inventory certificate, which may then be used in confidence to ensure that update packages used in the administration of the IHS do not include known vulnerabilities and have been validated for use with workloads supported by IHS 200.

As described with regard to FIGS. 1 and 2, an IHS may include a remote access controller that provides capabilities for remote management of an IHS, where these remote management capabilities may include sideband management of various managed hardware components of an IHS. In some embodiments, the generation of an inventory certificate, including vulnerability proofing instructions for use of update packages, for a newly assembled IHS may be initiated via a request from the factory provisioning application to the remote access controller of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate by generating a cryptographic key pair for use in validating the authenticity of inventory information and for authenticating the vulnerability proofing instructions included in the inventory certificate.

In some embodiments, the remote access controller generates a certificate signing request (CSR) for the generation of a digital identity certificate, where the request specifies the public key of the key pair generated by the remote access controller, and also specifies the factory installed hardware inventory from the manifest that was generated during assembly of the IHS, and also specifies an inventory of the authorized firmware for one or more of the managed hardware components of the IHS, and also specifies vulnerability proofing instructions for generating update packages for administration of the IHS. The factory installed and provisioned hardware and firmware inventory information and vulnerability proofing instructions that are included in the CSRs may be signed by the remote access controller using the private key from the generated keypair. The CSR for the requested identity certificate may then be transmitted to the factory provisioning application.

The factory provisioning application may submit the CSR for signing by a factory certificate authority. Upon receipt of the CSR, the factory certificate authority may parse from the CSR: the hardware inventory information, the inventory of authorized firmware for the managed hardware components of the IHS, the vulnerability proofing instructions for generating update packages for the IHS, the public key generated by the remote access controller and the information specifying a requested signing key. Based on the information parsed from the CSRs, the factory certificate authority generates a digital identity certificate, referred to herein as an inventory certificate, that is associated with the public key provided by the remote access controller and that specifies the factory installed hardware inventory of the IHS and vulnerability proofing instructions for generating update package for the IHS.

The factory certificate authority may submit the generated inventory certificate for signing by a hardware security module that may be a dedicated hardware component of a factory provisioning server that safeguards cryptographic keys and implements cryptographic functions utilized in the factory provisioning process. The hardware security module digitally signs the submitted inventory certificate, which is then returned to the factory provisioning application. In some embodiments, the factory provisioning application may retain a copy of the signed certificate. In some instances, copies of the inventory and device certificate may be retained to reference data store utilized in providing ongoing support of the IHS once it has been shipped and has been deployed by a customer, such as in issuing updated certificates for an IHS in response to changes to the IHS that result in changes to the authorized hardware and/or software supported by the IHS, and in response to changes in vulnerability proofing requirements for the generation of update packages for the IHS.

The signed inventory certificate may then be loaded to the assembled IHS as part of the factory provisioning of the IHS. In some embodiments, the signed inventory certificate may be uploaded to a secured memory of the remote access controller, such as described with regard to FIG. 2. With the generation and transfer of the signed identity certificate completed, additional factory provisioning of the assembled IHS may be completed and, at 310, the assembled IHS is shipped from the factory to a customer. The IHS may be received at a data center and may be further provisioned for deployment within the data center.

Once a received IHS has been provisioned for operation within a datacenter, at 315, the IHS is initialized. As part of the initialization of the IHS, various procedures may be implemented for validating the authenticity of the hardware components of the IHS. As described, an IHS may be factory provisioned to include an inventory certificate that specifies the factory installed hardware components of the IHS. At 320, such a factory-provisioned inventory certificate may be utilized to validate the hardware components detected during initialization of the IHS. Each detected hardware component is identified by the IHS and the hardware component may be initialized only if its detected identity matches a hardware identity specified in the factory provisioned inventory certificate. In this same manner, the factory-provisioned firmware for these hardware components may also be validated against one or more firmware identities specified in the inventory certificate.

One of the hardware components that may be validated in this manner is a remote access controller of an IHS, where both the identity of the remote access controller and the firmware instructions loaded for use by the remote access controller may be validated based on the signed inventory certificate. At 325, these validated instructions may be used in initializing the remote access controller. Once initialized, at 330, the remote access controller collects an inventory of the detected managed hardware components of the IHS. As described with regard to FIG. 2, a remote access controller may utilize various inband and sideband buses in providing remote management of an IHS and of certain individual hardware components of the IHS. Utilizing these capabilities, the initialized remote access controller may detect each of the managed hardware components that have been successfully validated and initialized.

Once the remote access controller and other hardware of the IHS have been validated as authentic and operating using authentic instructions, at 335, the IHS is fully initialized, such as booting of an operating system and other user applications. Once in operation, the IHS may operate for any period of time before requiring any updates, but an IHS will inevitably require updates. As described, an IHS may be updated in order to correct errors or other undesirable behavior. IHS updates may improve performance or functionality that may be offered using the software and hardware of the IHS. In some instances, IHS updates may be made in order to configure the IHS for a particular purpose. For instance, a set of IHS updates may be used to configure a hardware accelerator and a set of storage drives as a high-performance data storage cluster, such as for use in particular types of machine learning systems.

As illustrated, in FIG. 3, at 345, an update system, such as a cloud system operated by an entity providing technical support for the IHS, receives a request to generate an update package for the IHS. In some embodiments, the request to generate the update package may be received from the customer purchasing the IHS, such as part of technical support request or as part of a configuration being made by the IHS. In some embodiments, the request to generate the update package may be received from an administrator making configuration changes to the IHS, such as via the remote management interface described with regard to FIG. 1. In some embodiments, the request to generate the update package may be received from systems operating on the IHS, such as via remote management systems operating on the remote access controller of the IHS. In some embodiments, the request to generate the update package may be received from the services providing technical support for the IHS, components installed in the IHS and/or workloads operating on the IHS. In some embodiments, the request to generate the update package may be received in response to point-of-sale information, such as in response to a sale of a network controller for installation in the IHS.

In updating an IHS, an administrator may select a profile of existing update package for use in generating an update package for the IHS, where the update package may specify hardware and software configurations for one or more components of the IHS. As described, an update package may include updates to software utilized by the IHS, such as an update to the firmware utilized by a hardware component of the IHS or an update to the operating system of the IHS. An update package may also include various settings to the hardware and software of an IHS, such as updated registry settings the support compatibility between different components of the IHS.

Rather than locate or create a new update package, an administrator may identify a previously used update package when administering an IHS. As a known update package is used repeatedly in this manner for updating IHSs within a datacenter, some update packages are relied upon as "golden" configurations that have been used successfully and are thus trusted by the administrator. However, such reliance on use of existing update packages may result in an IHS being configured with known vulnerabilities, or with configurations that have not been validated for use with workloads supported by the IHS. By utilizing an existing update package, an administrator may be unaware that configurations included in the update package may have known vulnerabilities. For example, an update package may include configuration of use of a particular firmware version by a network controller installed in the IHS, but an administrator may be unaware that a security vulnerability has been identified in this particular firmware version. Unless the administrator actively investigates whether any vulnerabilities have been identified in the configurations of an existing update package that is being used to administer the IHS, and unless the administrator addresses any identified vulnerabilities, the intended updating of the IHS will be compromised at the outset with known vulnerabilities.

At 350, the update system issues a query to the remote access controller of the IHS in order to determine the vulnerability proofing requirements for that particular IHS, and in particular for the generation of updates for that particular IHS. Rather than query any system other than the IHS for vulnerability proofing requirements for the IHS, the update system queries the remote access controller of the IHS for factory provisioned vulnerability proofing requirements for the IHS, thus obtaining the most current requirements that are actually being enforced by the IHS. In addition, the validation proofing requirements for an IHS may be dependent on the current context in which the IHS operating, as determined by the remote access controller of the IHS.

During the ongoing operation of the IHS, as illustrated at 338, the IHS receives the request from the update system for the vulnerability proofing requirements of the IHS. As described above, in some embodiments, vulnerability proofing instructions for generation of an update package for an IHS may be specified within a factory provisioned inventory certificate of the IHS that can be confirmed as authentic. For instance, a factory provisioned inventory certificate of an IHS may specify requirements that update packages used in the administration of the IHS may not include any known vulnerabilities and must and any remediations to identified vulnerabilities have been validated for use with workloads supported by IHS, thus ensuring that the factory provisioned configuration of the IHS remains without known vulnerabilities and compliant with workload requirements, despite the IHS being updated from time to time.

In some instances, an inventory certificate of an IHS may specify that certain types of hardware components of the IHS, such as all storage drives, must be configured with no known vulnerabilities when using an update package, in order to mitigate the risk of simultaneously compromising all of the storage resources of an IHS. In some instances, an inventory certificate may specify that certain types of hardware component updates included in an update package must not include any known vulnerabilities and must be validated as being compliant with a specific workload supported by the IHS. For example, vulnerability proofing requirements of an inventory certificate mays require that all hardware accelerators of an IHS must be updated with no known security vulnerabilities and remediated updates must be validated as compliant with a specific security workload, in light of the use of the hardware accelerators in implementing high-availability cryptographic security workloads used in secure communications systems. In this same manner, the vulnerability proofing instructions included in an inventory certificate may specify that an update package may not include known security vulnerabilities, but use of an update package may proceed with identified functional vulnerabilities, such as known software bugs that are not exploitable as security loopholes, as long as the functional vulnerabilities not being associated with the workloads being supported by the IHS. For instance, a functional vulnerability that may not preclude some updates to an IHS may include a software bug that results in a graphics controller using non-calibrated display settings that distort color outputs of a display monitor and is not associated with the virtual reality workloads being supported by the IHS.

In some embodiments, the inventory certificate may also specify one or more catalogs of known vulnerabilities that are to be consulted when generating update packages for use in the administration of an IHS. For instance, the inventory certificate may specify that catalogs maintained by the datacenter in which the IHS is installed must be evaluated for known vulnerabilities when generating an update for the IHS. In another instance, the inventory certificate may specify that catalogs maintained by the customer that purchased the IHS must be evaluated for known vulnerabilities when generating an update for the IHS. In this manner, an enterprise that manages a large number of IHSs may specify requirements for vulnerability proofing all of their IHSs using catalogs of known vulnerabilities that are controlled by the enterprise and that are securely stored by the individual IHSs. In addition, datacenter administrators tasked with maintaining support for workloads are assured that updates to IHS do not inadvertently disrupt high-availability workloads and that any updates that are not validated as being compatible with the technical and performance requirements for a workload will be rejected. Since the catalogs that are used in the evaluation of updates for vulnerabilities are specified in the factory-provisioned inventory certificate of the IHS, the customer receiving the IHS remains assured of delivery in compliance with workload requirements and of the IHS remaining in compliance, with control over whether updates have been sufficiently proven to be compatible with the requirements of a workload. Updating the catalogs that are evaluated for vulnerability proofing configurations of the IHS cannot be circumvented without a factory provisioned update to the inventory certificate that specifies the catalogs that must be investigated for known vulnerabilities. In this manner, datacenter administrators tasked with maintaining support for the IHSs are assured that the each time a configuration is made, it does not include a configuration with a known vulnerability and thus does not inadvertently introduce vulnerabilities that could impact the entire datacenter.

Figure 4:
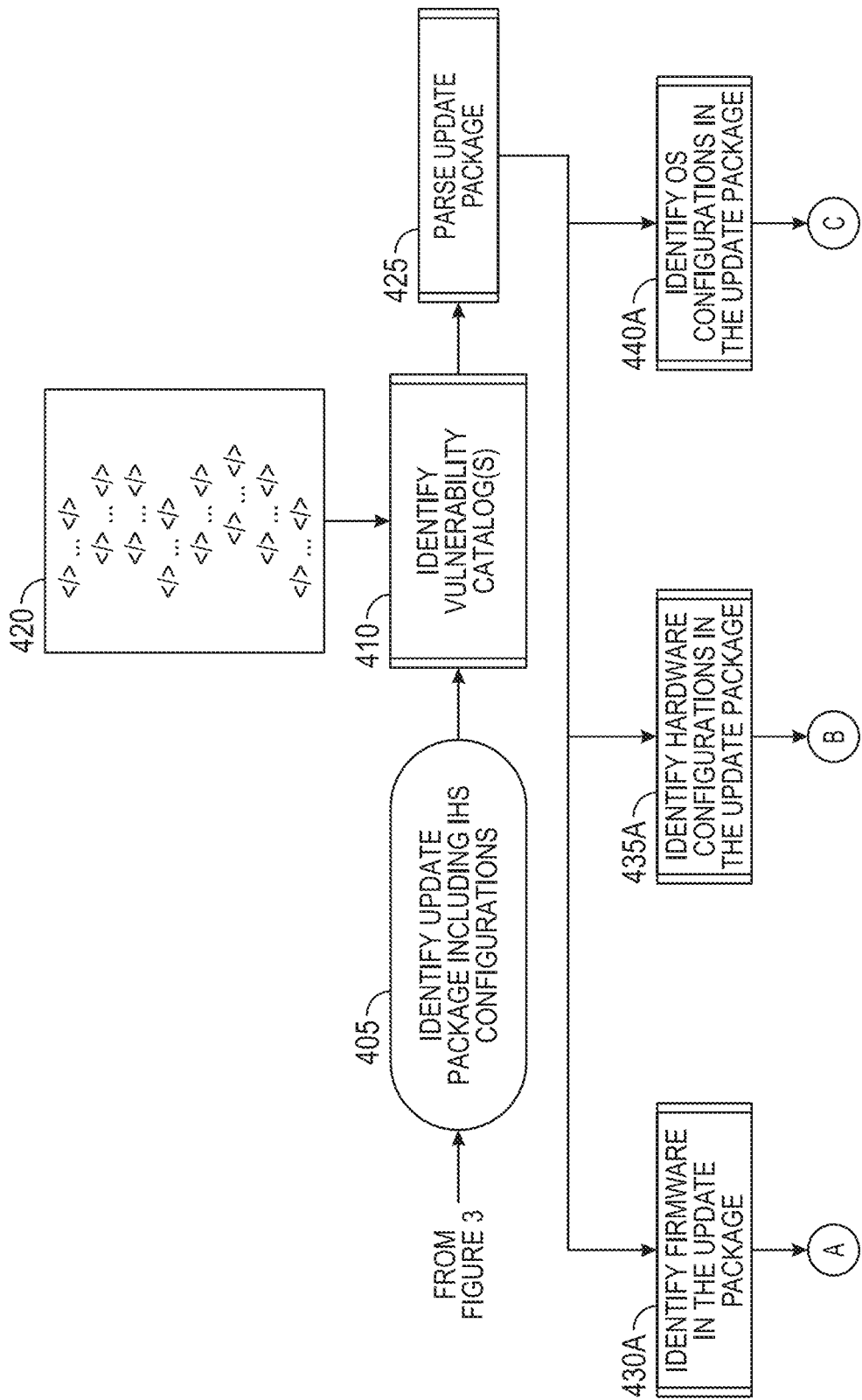
FIG. 4 is a flow chart diagram illustrating certain additional steps of methods, according to some embodiments, for validated vulnerability proofing of updates used in the administration of an IHS.
Figure 4:
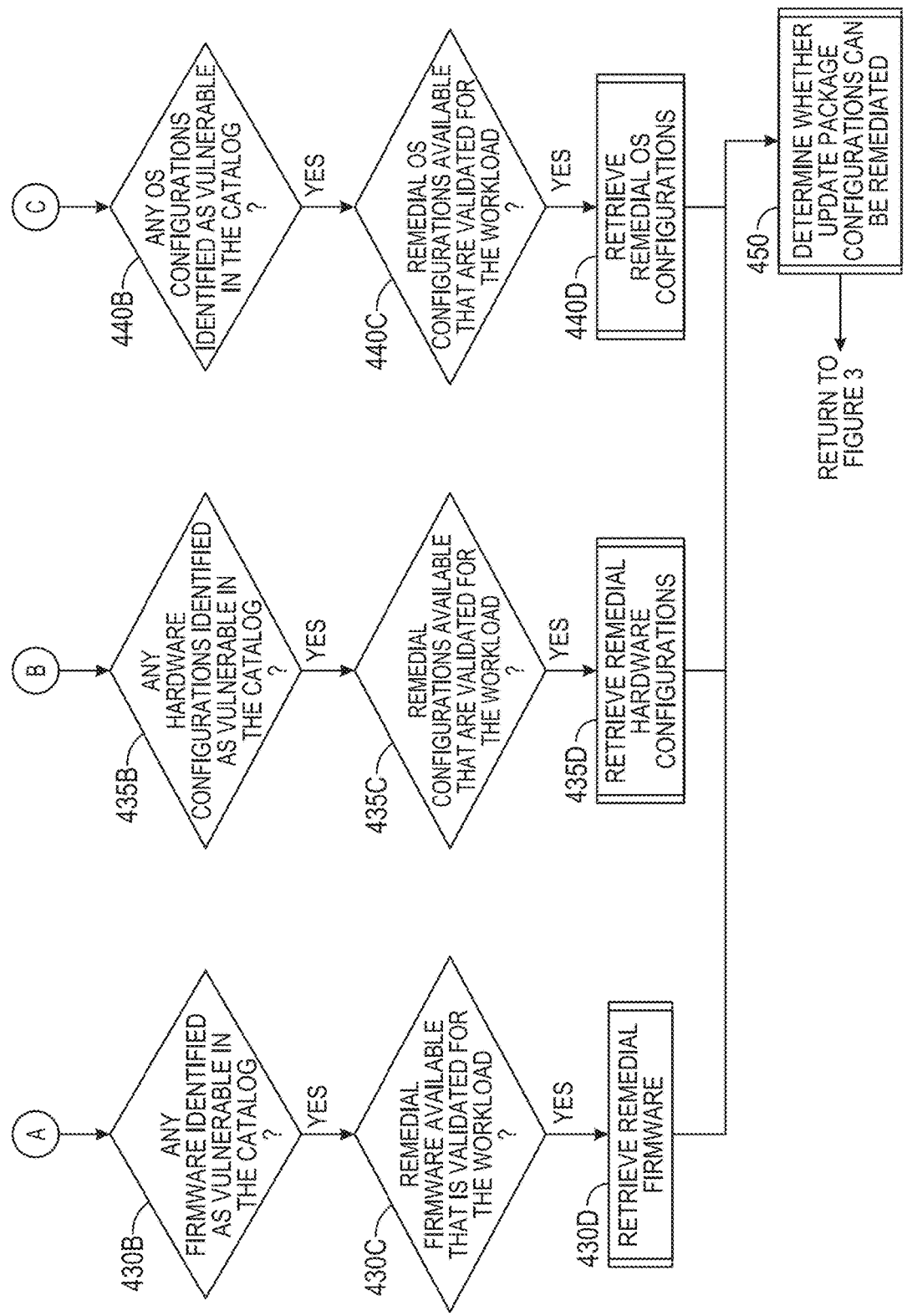

Once the vulnerability proofing requirements for the use of update packages in the administration of IHS have been identified, at 342, the remote access controller notifies the update system of the requirements, including the types of vulnerabilities that must be investigated, catalogs that must be investigated, workload validation requirements for remediations that address vulnerabilities in proposed configurations for the IHS, and responses to detected vulnerabilities in a proposed update package. Based on the instructions provided by the IHS, at 350, the update system identifies any known vulnerabilities in the proposed update package that is being generated for the IHS. FIG. 4 is a flow chart diagram illustrating certain additional steps of methods, according to some embodiments, for further vulnerability proofing of the generated of update packages for use in the administration of an IHS. Embodiments of FIG. 4 may begin, at 405, with the identification of an update package that is proposed for use in administering an IHS. As described above, in some instances, an update package may be generated from scratch for an IHS and in some instances, an update package may be generated from an existing update package profile. Based on the vulnerability proofing requirements provided by the remote access controller, at 410, the update system identifies one or move catalogs 420 of known vulnerabilities, that may include hardware, software and/or workload configurations with known vulnerabilities, to be used in the evaluation of the update package for use by the IHS. A catalog may be any collection of structured data, such as a database, data structure or a file, such as an XML file. A catalog is intended to be generally available to the public and is intended as available to data center administrators.

One or more different entities may generate and maintain catalogs 420 specifying known vulnerabilities of hardware and/or software components that may be installed in an IHS. For instance, the manufacturer of an IHS may maintain one or more catalogs specifying known vulnerabilities identified in IHS models sold by the manufacturer, known vulnerabilities of factory installed hardware components of IHSs sold by the manufacturer, known vulnerabilities in hardware and/or software configurations supported by these hardware components and known vulnerabilities in workload configurations supported by IHSs sold by the manufacturer. Similar catalogs 420 of known vulnerabilities may be maintained by other entities, such as third parties that publish known security vulnerabilities that have been identified in products sold by various different manufacturers. In some instances, catalogs 420 of known vulnerabilities may be maintained by entities contracted to provide technical support for an IHS or for a network of IHSs, such as for one or more data centers. In some instances, catalogs 420 of known vulnerabilities may be maintained by hardware component manufacturers, such as a manufacturer of network controllers that maintains a catalog of vulnerabilities that have been identified in its supported products. In some instances, catalogs 420 of known vulnerabilities may be maintained by a customer that has purchased the IHS, such that the customer maintains administrative control over vulnerability proofing requirements for the IHS through the information that is include in a catalog 420 that is included in the factory provisioned inventory certificate of the IHS. In some instances, individual data centers or groups of data centers may maintain catalogs of vulnerabilities that are known to exist within the datacenter(s).

As described, an IHS may be factory provisioned with an inventory certificate that specifies vulnerability proofing instructions for the generation of update packages for use in the administration of the IHS. In some embodiments, the vulnerability proofing instructions may also specify the catalogs that must be used in identifying known vulnerabilities in update packages, where the validity of this catalog information included in the inventory certificate can be confirmed based on the digital signatures included in the inventory certificate. In some embodiments, the catalogs that are used in identifying known vulnerabilities in update packages may be supplemented through the generation of an updated inventory certificate that adds to the catalogs that must be searched for vulnerabilities by the vulnerability proofing procedures implemented by the remote access controller, such as to reflect the IHS being reconfigured to support a new workload. In this manner, the inventory certificate may be used to configure vulnerability proofing on an individual IHS, such that the IHS is provided with the best known sources of vulnerability information for use in administration of the IHS.

Despite the existence of such vulnerability catalogs, their use is not enforced within existing procedures for using update packages to administer IHSs, thus providing the described opportunity for an IHS to be updated with known vulnerabilities. Even if consulting such catalogs of known vulnerabilities is technically a required step in updating an IHS, such requirements cannot be enforced. Moreover, even when an administrator attempts to consult the vulnerability catalogs, the highly tedious task of determining whether any of the hardware or software configurations of an update package are present in any of the available vulnerability catalogs is an error-prone task. Additionally, such vulnerability catalogs may be updated at any time, thus requiring an administrator to repeat a complete search for vulnerabilities for each and every use of an update package. Despite the difficulty of enforcing the use of these vulnerability catalogs, such catalogs are still an effective way of disseminating information specifying known hardware and software vulnerabilities to a wide array of customers.

Embodiments may continue, at 425, with the parsing of the hardware and software configurations included in the update package. As illustrated in FIG. 4, the configuration information parsed from the update package may be evaluated against the known vulnerabilities specified in the vulnerability catalogs. In parsing the update package, at 430a, the update system identifies versions of firmware to be installed by the update package. For instance, administration of a FPGA card of an IHS may include installing firmware for use in reprogramming the FPGA for use in specific machine learning workloads, such as in implementing and training neural networks. At 430b, the update system determines whether this particular version of firmware included for use by the FPGA in the update package has been associated with any known vulnerabilities that are specified in any of the one or more catalogs that are being consulted as part of the vulnerability proofing of the IHS. If no vulnerabilities are identified, updating of the FPGA firmware using the update package is authorized.

However, as indicated in FIG. 4, if any vulnerabilities are identified, at 430c, the update system identifies any available remediation procedures, such as using a different version of the firmware that can be used for similarly programming the FPGA to support the machine learning workloads that are supported using the FPGA capabilities. In embodiments, the remediation procedures available for addressing known vulnerabilities are themselves also specified within the vulnerability catalogs. For instance, the vulnerability catalog entry that specifies the vulnerability in the selected FPGA firmware may specify an upgraded version of the firmware that patches a discovered security vulnerability, or may specify a downgraded version of the firmware that functions adequately and avoids a security vulnerability in the most recent version of the firmware.

In addition to specifying remediation procedures for specific known vulnerabilities, in embodiments, a catalog also specifies whether a remediation procedure for a known vulnerability has been validated as being compatible with specify workloads. For instance, an IHS may be configured to support a workload that supports transmissions by a high-availability streaming media service. In some instances, an IHS may be configured for operation of such workloads during factory provisioning of the IHS. Once an IHS has been factory provisioned for operation of such workloads, any updates to the IHS are preferably made without affecting the ability of the IHS to continue to support these workloads. Accordingly, the catalog used in vulnerability proofing updates for the IHS may be updated to indicate that for a particular vulnerability, a remediation is available that has been validated as being compliant with the workloads being supported by the IHS. In embodiments, the catalog is updated with a validated remediation entry only after that remediation has been validated as being compliant with technical and performance requirements of the workloads supported by the IHS, where the entity controlling the catalogs specified in the inventory certificate controls whether a remediation procedure has been sufficiently validated.

In such embodiments, once a vulnerability and an associated remediation have been identified within a catalog, the operator of an IHS may prefer to delay remediation of the IHS until testing procedures have validated that, if implemented, these remediation procedures do not adversely impact workloads that are being supported by the IHS. Since the catalogs that are specified in the inventory certificate may be controlled by an operator of the IHS, such as a datacenter administrator, the delivery of updates to an IHS is also controlled by that operator of the IHS, with assurances that updates are not delivered to the IHS until the operator has verified that the update can be remediated such that it is compliant with the workloads of the IHS and the operator has subsequently updated the catalog to reflect the validated compliance of the remediated update with the workload requirements. Accordingly, in the example of an update specifying use of FPGA firmware with known vulnerabilities, at 430c, embodiments consult the catalogs of vulnerabilities for a remediation, such as an upgraded or downgraded version of the firmware that is available for use, and an associated indication that the remediation has been validated as compatible with the machine learning workloads being supported using the capabilities of the FPGA. Once embodiments confirm that the remediated update is compliant with the workload requirements, at 430d, the remediated firmware version is retrieved.

Also in parsing the update package, at 435a, the update system identifies any hardware configurations included in the update package. For instance, updates for a storage controller of an IHS may include configuring the storage controller for operation within a specific storage workload that is operating within a data center, such as configuration of the storage controller as a part of cluster of servers that implement a RAID storage system. At 435b, the update system determines whether this RAID configuration when used by this particular storage controller has been associated with any known vulnerabilities that are specified in any of the one or more catalogs that are being consulted as part of the vulnerability proofing. If no vulnerabilities are identified, use of the hardware configurations in the update package are authorized.

However, as indicated in FIG. 4, if any vulnerabilities are identified, at 435c, the update system identifies any available remediation procedures that are compliant with the workloads supported by the IHS, such as using an alternate hardware configuration, where the available remediation procedures may also be specified within the vulnerability catalogs. For instance, the vulnerability catalog entry that specifies a vulnerability in use of level 1 RAID configuration with a particular type of storage controller may specify an alternative use of level 2 RAID configurations that avoids a discovered error in level 1 configurations and that has been validated as compliant with the supported workloads. At 435d, the validated remediation configurations are retrieved.

Also in parsing the update package, at 440a, the update system identifies any operating system configurations included in the update package. For instance, use of certain graphics functions supported by a newly installed GPU may require use of a particular version of an operating system on the IHS. Accordingly, an update package for use in administering the GPU may include a configuration that upgrades the operating system of the IHS to a new version. At 440b, the update system determines whether this operating system configurations have been associated with any known vulnerabilities that are specified in any of the one or more catalogs that are being consulted as part of the vulnerability proofing. If no vulnerabilities are identified, use of the operating system configurations in the update package are authorized. However, as indicated in FIG. 4, if any vulnerabilities are identified, at 440c, the update system identifies any available remediation procedures that are compliant with the workloads supported by the IHS, such as using a still newer upgraded operating system version that addresses issues in the version specified in the profile, where the available remediation procedures and workload validations may also be specified within the vulnerability catalogs. At 440d, the validated remediation OS configurations are retrieved.

As indicated in FIG. 4, at 450, embodiments may confirm that the update package can be remediated using the validated remediation procedures selected from the vulnerability catalogs. As indicated, returning to 355 of FIG. 3, the update system determines whether any restrictions may prevent adaptation of the update package using the validated remediation procedures. In some embodiments, the update system may issue queries to the IHS and/or to other system in order to determine restrictions that may prevent remediation of the update package generated for the IHS. In some instances, applicable service agreements may preclude use of a particular remediation procedure. For example, an applicable service agreement for the IHS may authorize use of only certain RAID configuration levels, even though a new storage controller being installed may support a wider range of RAID configurations. In such a scenario, embodiments may determine that remediation procedures that include use of a non-authorized RAID configuration are not available for use on the IHS. In another example, embodiments may determine that a remediation procedure specifying an upgrade to firmware used by a PCIe switch would render the PCIe switch as non-compatible with the GPU that is coupled to the PCIe switch, but does not yet support this upgraded firmware of the PCIe switch.

As indicated, at 362, the update system may confirm the remediated configurations are compatible with workloads that are operating on the IHS. In some embodiments, the update system retrieves configuration information for the workloads operating on the IHS. In some instances, the update system also retrieves vulnerability proofing requirements from the IHS for the workloads operating on the IHS. The update system then retrieves compatibility requirements for the workloads operating on the IHS. In scenarios where the current workload configurations are not compatible with the remediated updates, the update system may identify any other workload configurations that are compatible with the remediated updates and that can be used in place of the current workload configurations.

In instances where the validated remediation configurations can be utilized by the IHS and the remediated configurations are compatible with the workloads operating on the IHS, the update package is amended based on the remediation procedures, and the update continues, at 365, using the remediated update package. In some embodiments, the validated remediation procedures that will be used to amend the update package may be specified to the administrator that has requested use of the update package, such as via a graphical interface of the remote management interface being used by the administrator. In some embodiments, the administrator may be notified of the identified vulnerabilities in the update package and may be further notified of the remediation procedures that have been identified and confirmed as available for use by the IHS. In some embodiments, the administrator may be asked to confirm the amendments to the update package. In some embodiments, the administrator may be notified that the remediated updates have been validated as being compliant with workloads being supported by the IHS.

Once the validated and remediated update package has been deployed, at 370, the IHS is deployed and put back into service within the data center, now utilizing the updated software and hardware configurations from the remediated update package. By preemptively addressing known vulnerabilities in the update package presented by the administrator, once the IHS is deployed, it is ready for immediate use. In existing systems, an IHS may be updated without addressing known vulnerabilities. Once the updated IHS is deployed, various tools may be used to identify and address these vulnerabilities. However, if the IHS is deployed with known vulnerabilities, opportunities are provided for these vulnerabilities to be exploited before they are actually addressed. Additionally, deferring remediation of the vulnerabilities until the IHS has been deployed will result in the IHS being taken back out of service to address the vulnerabilities, thus immediately reducing its availability. Embodiments thus provide capabilities by which update packages may be generated in a manner that addresses all known vulnerabilities in the hardware and software configurations that are present in an update package and where vulnerabilities identified in the update package are remediated with configurations that are validated as compliant with workloads of the IHS, thus preventing an IHS from being updated without addressing known vulnerabilities that may impact workloads operating on the IHS, and thus saving an administrator the time and effort required to determine whether a previously used update package is without vulnerabilities and whether the update package will adversely affect workloads operating on the IHS.

As indicated, in scenarios where the identified vulnerabilities cannot be remediated or available remediations have not been validated, at 360, further use of the update package in administering the IHS may be terminated such that the update package is not transmitted to the IHS by the update system. In some instances, repeated attempts may be made to identify available remediation procedures that can used to address identified vulnerabilities and that are available for use on the IHS. However, in scenarios where no remediation procedures are available that are validated for a workload operating on the IHS, embodiments prevent use of the update package on the IHS. In some embodiments, upon receipt of a notification from the update system that update has been terminated and is not being sent, the remote access controller may issue a request for an updated inventory certificate for the IHS that includes more relaxed vulnerability proofing requirements that may allow use of the update. In response to such a request, an administrator may also address the issue through modification of the catalogs that are used as the source of known vulnerabilities in evaluating configuration changes.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) supporting a computational workload, the IHS comprising:
   one or more CPUs utilizing one or more buses that connect to a plurality of hardware components of the IHS; and
   a remote access controller supporting remote management of the Information Handling System (IHS), the remote access controller comprising a logic unit and a memory device having instructions stored thereon that, upon execution by the logic unit, cause the remote access controller to:

receive, from an update system, an indication of an update comprising configurations for a plurality of the hardware components of the IHS;

retrieve a plurality of vulnerability proofing requirements for updates that modify the configuration the plurality of hardware components of the IHS, wherein the vulnerability proofing requirements comprise requirements for updates that are validated for operation of the workload;

transmit the vulnerability proofing requirements to the update system, where based on the vulnerability proofing requirements a plurality of catalogs specifying known vulnerabilities of hardware components are consulted to determine whether configurations from the update are identified as vulnerable in one or more of the catalogs and whether remediations to the identified vulnerabilities are validated for operation of the workload;

when the configurations from the update are not identified in the plurality of catalogs specified in the vulnerability proofing requirements, receive transmission of the update from the update system for use in updating the configurations for the hardware components of the IHS; and when the configurations from the update are identified in the catalogs specified in the vulnerability proofing requirements and remediations to the identified vulnerabilities are not validated for operation of the workload, receive a notification from the update system that the update has been terminated.

2. The IHS of claim 1, wherein the plurality of catalogs comprise a catalog of vulnerabilities known to a manufacturer of the IHS.

3. The IHS of claim 1, wherein the plurality of catalogs comprise a catalog of vulnerabilities known to an entity operating the IHS.

4. The IHS of claim 1, wherein the vulnerability proofing requirements are retrieved from a factory provisioned identity certificate of the IHS.

5. The IHS of claim 4, wherein the validation proofing requirements in the inventory certificate further specify the plurality of catalogs of known vulnerabilities for use in identifying configurations that are vulnerable.

6. The IHS of claim 4, wherein the validation proofing requirements in the inventory certificate further specify the workload that is supported by the IHS and a requirement of updates that are validated as compatible with the workload.

7. The IHS of claim 1, wherein remediations specified in the catalogs as validated remediation to an identified vulnerability are validated as complying with technical and performance requirements for the workload.

8. The IHS of claim 7, wherein the validation of the remediations as complying with technical and performance requirements for the workload is determined in a test environment the is operated using a datacenter remote management interface.

9. The IHS of claim 1, wherein the configurations of the update comprises a firmware update for instructions used to operate a first of the hardware components.

10. The IHS of claim 9, wherein the catalogs specify alternate firmware versions that are used to operate the first of the hardware components, and that are not associated with known vulnerabilities, and that have been validated for operation of the workload.

11. The IHS of claim 4, wherein, in response to the notification from the update system that the update has been terminated, further logic execution causes the remote access controller to issue a request for updated identity certificate with updated vulnerability proofing requirements.

12. A method for vulnerability proofing updates to an IHS (Information Handling System), wherein the vulnerability proofing is implemented by a remote access controller of the IHS that provides remote management of the IHS, the method comprising:

receiving, from an update system, an indication of an update comprising configurations for one or more of the plurality of hardware components of the IHS;

retrieving a plurality of vulnerability proofing requirements for updates that modify the configuration the plurality of hardware components of the IHS, wherein the vulnerability proofing requirements comprise requirements for updates that are validated for operation of the workload;

transmitting the vulnerability proofing requirements to the update system, where based on the vulnerability proofing requirements a plurality of catalogs specifying known vulnerabilities of hardware components are consulted to determine whether configurations from the update are identified as vulnerable in one or more of the catalogs and whether remediations to the identified vulnerabilities are validated for operation of the workload;

when the configurations from the update are not identified in the plurality of catalogs specified in the vulnerability proofing requirements, receiving transmission of the update from the update system for use in updating the configurations for one or more of the plurality of hardware components of the IHS; and when the configurations from the update are identified in the plurality of catalogs specified in the vulnerability proofing requirements and remediations to the identified vulnerabilities are not validated for operation of the workload, receiving an notification from the update system that the update has been terminated.

13. The method of claim 12, wherein the plurality of catalogs comprise a catalog of vulnerabilities known to a manufacturer of the IHS.

14. The method of claim 12, wherein the plurality of catalogs comprise a catalog of vulnerabilities known to an entity operating the IHS.

15. The method of claim 12, wherein the vulnerability proofing requirements are retrieved from a factory provisioned identity certificate of the IHS.

16. The method of claim 15, wherein the validation proofing requirements further specify the plurality of catalogs of known vulnerabilities for use in identifying configurations that are vulnerable.

17. A system comprising:

a remote management interface used in management of a datacenter comprising a plurality of IHSs, wherein the remote management interface is configured to:

generate modifications to configurations of hardware components of a first of the plurality of IHSs;

query the first IHS for vulnerability proofing requirements for modifications to configurations of the plurality of hardware components of the first IHS, wherein the vulnerability proofing requirements comprise requirements for modifications that are validated for operation of the workload;

based on the vulnerability proofing requirements, access a plurality of catalogs specifying known vulnerabilities of hardware components to determine whether the modifications are identified as vulnerable in one or more of the catalogs and whether remediations to the identified vulnerabilities are validated for operation of the workload;

when the modifications to the configurations of the hardware components of the first IHS are not identified in the plurality of catalogs specified in the vulnerability proofing requirements, transmission the modifications to the first IHS; and when modifications to the configurations of the hardware components of the first IHS are identified as vulnerable in the plurality of catalogs specified in the vulnerability proofing requirements, terminate the update; and the first IHS comprising:

one or more CPUs utilizing one or more buses that connect to a plurality of hardware components of the IHS; and a remote access controller supporting remote management of the first IHS, the remote access controller comprising a logic unit and a memory device having instructions stored thereon that, upon execution by the logic unit, cause the remote access controller to:

receive the notification of modifications to configurations of hardware components of the first IHS; and in response to the query from the update system, retrieve, from a persistent data storage of the first IHS, a plurality of vulnerability proofing requirements for updates that modify the configuration of hardware components of the first IHS, wherein the vulnerability proofing requirements comprise the requirements for modifications that are validated for operation of the workload.

18. The system of claim 17, wherein the plurality of catalogs comprise a catalog of vulnerabilities known to a manufacturer of the IHS.

19. The system of claim 17, wherein the plurality of catalogs comprise a catalog of vulnerabilities known to an entity operating the IHS.

20. The system of claim 17, wherein the vulnerability proofing requirements are retrieved from a factory provisioned identity certificate of the IHS.

* * * * *